United States Patent [19]
Nakazawa et al.

[11] 3,791,735
[45] Feb. 12, 1974

[54] DIGITAL MEASURING APPARATUS
[75] Inventors: Kiwao Nakazawa, Sagamihara; Shinya Sasayama, Tokyo, both of Japan
[73] Assignee: Nippon Kogaku K.K., Tokyo, Japan
[22] Filed: May 18, 1972
[21] Appl. No.: 254,469

[30] Foreign Application Priority Data
May 26, 1971 Japan.............................. 46-35478

[52] U.S. Cl. ............... 356/4, 356/141, 250/219 LG, 250/219 WD, 356/158, 356/160, 235/92 V
[51] Int. Cl. ............................................ G01b 11/00
[58] Field of Search ......... 356/141, 4, 32, 158, 160; 250/219 S, 219 LG, 219 WD

[56] References Cited
UNITED STATES PATENTS
| | | | |
|---|---|---|---|
| 3,475,611 | 10/1969 | Kitchner | 250/219 WD |
| 3,325,594 | 6/1967 | Goldhammer et al. | 250/219 WD |
| 3,102,204 | 8/1963 | Ingber | 250/219 S |

*Primary Examiner*—Maynard R. Wilbur
*Assistant Examiner*—S. C. Buczinski
*Attorney, Agent, or Firm*—Fitzpatrick, Cella, Harper & Scinto

[57] ABSTRACT

A digital measuring apparatus for measuring the distance between two target lines formed on a test sample by the use of circular scanning or the like includes an optical pulse scale disposed in such a predetermined relationship with the target lines as to correct any measurement error resulting from circular (or angular) scanning. A scanning system is disposed to scan the target lines and the optical pulse scale in a predetermined relationship, thereby producing optical target-line position signals and optical pulse scale signals. Photoelectric converter means are provided to convert the optical target-line position signals and the optical pulse scale signals into respective electrical signals. Target-line position signal detector means may detect the target-line positions from one of the said electrical signals. The electrical signals passed through the target-line position signal detector means may be formed into gate signals by a gate circuit. The other electrical signals passed through the gate circuit are counted by counter means.

3 Claims, 8 Drawing Figures

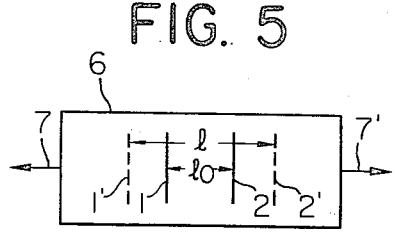
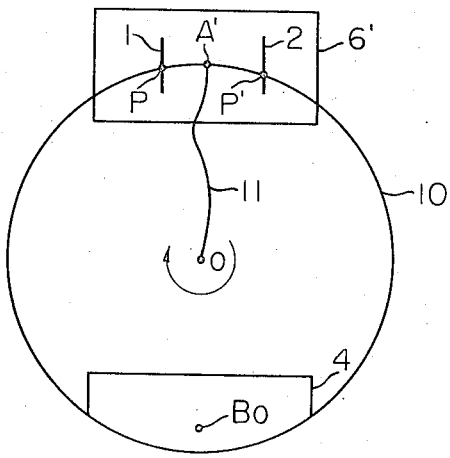
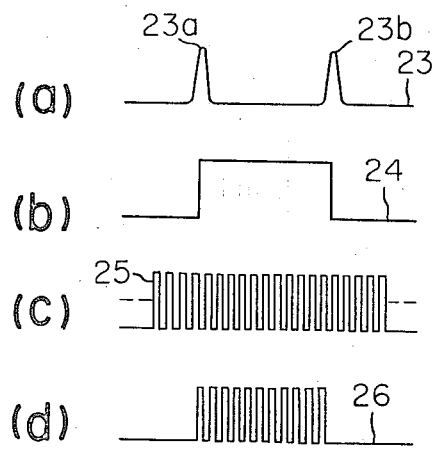
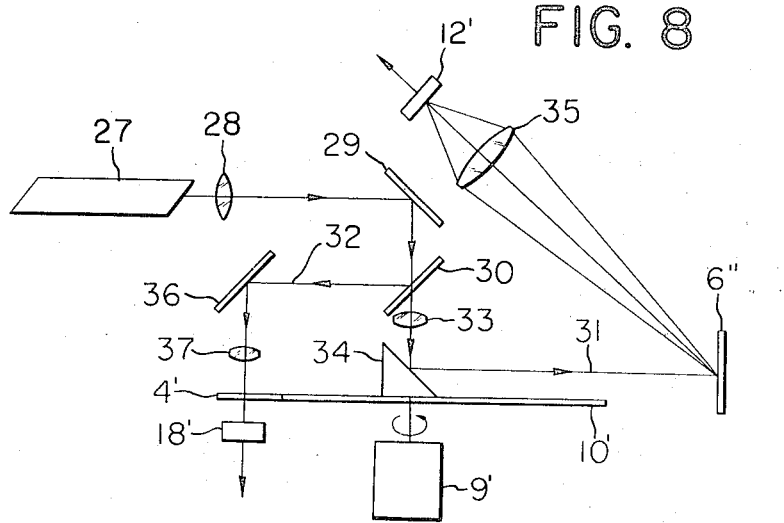

DIGITAL MEASURING APPARATUS

BACKGROUND OF THE INVENTION

1. Field of the Invention

This invention relates to measuring apparatus, and more particularly to such apparatus in which a test sample, or the image thereof, is optically scanned circularly (or angularly) for the purpose of photoelectrically and digitally measuring the positions of target lines formed on the test sample, and the distance between and the amount of displacement of such target lines.

2. Description of the Prior Art

Conventional apparatus of the described type measures the distance between the target lines on a test sample by the use of a series of clock pulses having equal time intervals; and such use of circular scanning has led to the measurement of the arcuate distance, instead of the linear distance, between the target lines, thus resulting in a measurement error.

To correct such measurement error, the prior art has resorted to an apparatus which automatically varies the pulse intervals of the clock pulses in synchronism with the circular scanning, but such an apparatus is, of necessity, very complex.

SUMMARY OF THE INVENTION

The present invention intends to correct the measurement error resulting from circular scanning and to accomplish accurate measurement of the target lines, without using the above-described complex apparatus; but only by arranging an optical pulse scale in a predetermined relationship with respect to a test sample and causing the test sample and the optical pulse scale to be scanned according to that predetermined relationship.

According to the present invention, there is provided an apparatus for optically measuring the distance between two reference lines on a test sample. The apparatus comprises detector means revolvable to optically scan the reference lines on the test sample and thereby produce light signals representing the positions of the reference lines. A first photoelectric converter element is provided for converting the light signals into electrical signals.

The apparatus further comprises an optical pulse scale which includes alternately and equidistantly disposed parallel light transmitting portions and light intercepting portions, and pulse signal generating means which is rotatable relative to the optical pulse scale optically to scan the same and thereby produce electrical pulse signals at least from the time the detector means scans one of the reference lines until it scans the other reference line.

The pulse signal generating means includes a first optical illuminating system for illuminating therethrough the optical pulse scale with a fine beam of light, and a second photoelectric converter element for receiving light from the first optical illuminating system through the light transmitting portions and converting such light into electrical signals.

The optical pulse scale is disposed so that the angles of the light transmitting and light intercepting portions thereof with respect to a line passing through the optical axis of the first optical illuminating system to a point identical with the center of rotation of the pulse signal generating means are equal to the angles of the reference lines with respect to a line passing through the detector means to the center of revolution of the detector means. The radius of revolution of the detector means may be substantially equal to the radius of rotation of the pulse signal generating means relative to the optical pulse scale.

The apparatus further includes wave-form shaping means for shaping the electrical signals into rectangular wave signals, an AND circuit having two input terminals, one of which receives the rectangular wave signals and the other of which receives the electrical pulse signals so that the electrical pulse signals are gated by the rectangular wave signals to provide, as output signals, electrical pulse signals representing the portions corresponding to the rectangular wave signals; and counter means for counting the electrical pulse signals passed through the AND circuit.

The center of revolution of the detector means may be coincident with the center of the pulse signal generating means; and the radius of revolution of the detector means may be equal to the radius of rotation of the pulse signal generating means.

The detector means may include a plate rotatably disposed in a plane identical with a plane containing the reference lines, and a light transmitting member provided on the plate. The light transmitting member has an input end for sensing the reference lines to provide light signals and an output end for applying such light signals to the first photoelectric converter element adjacent thereto.

The optical pulse scale may be mounted on the rotatable plate and the first optical illuminating system is fixed at such a position that the optical axis thereof passes within the circular locus of the optical pulse scale, whereby at least from the time the light transmitting member senses one of the reference lines until it senses the other reference line, the first optical illuminating system scans the optical pulse scale due to the relative revolution therebetween so that the second photoelectric converter element produces electrical pulses signals.

The positional relationship of the reference line and the optical pulse scale with respect to the center of rotation of the rotary plate may be equal to the positional relationship between the input end of the light transmitting member and the optical axis of the first optical illuminating system. The angles of the reference lines with respect to a line passing through the center of rotation of the rotatable plate to the input end of the light transmitting member may be equal to the angles of the light transmitting and light intercepting portions of the optical pulse scale with respect to a line passing through the center of rotation to the optical axis of the first optical illuminating system.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereinto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein:

FIG. 5 illustrates a test sample;

FIG. 6 illustrates the rotary disc portion used in FIG. 4;

FIG. 7 shows the waveforms of signals produced by circular scanning; and

FIG. 8 is a schematic representation of another embodiment of the apparatus according to the present invention.

DESCRIPTION OF THE PREFERRED EMBODIMENTS

The principles of the present invention will first be described.

Figure 1:
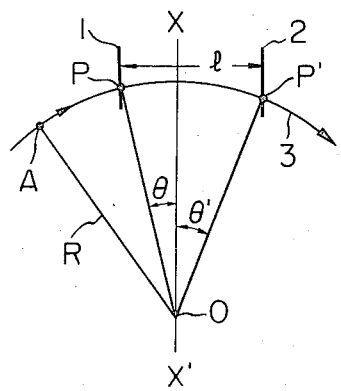
FIG. 1 is a diagram illustrating the manner in which the distance between two target lines is measured by circular scanning.

Referring to FIG. 1, it will be noted that target lines 1 and 2 are parallel to each other. For convenience of description, it is assumed that both the target lines 1 and 2 make a bright, clear contrast with the background. A straight center line X-X' is parallel to the target lines 1 and 2 passes through a center O which will later be described.

Numeral 3 designates the orbit followed by a point A as it is revolved for scanning along a circular line about the center point O so as to intersect the target lines 1 and 2. Actually, the point A may be a member formed with a pinhole-like opening and functioning to detect optical signals representing the positions of the target lines 1 and 2, and such point A is hereinafter referred to as "target-line position signal detecting sensor." If revolved for scanning along the scanning orbit 3, the target-line position signal detecting sensor A will scan the target lines 1 and 2 at points P and P', whereupon there will be obtained optical signals representing the positions of the target lines 1 and 2. When the distance $l$ between the target lines 1 and 2 is to be measured, the optical signals of the target-line positions obtained in the described manner may be converted into electrical signals and then, the number of clock pulses contained between these electrical signals may be counted by the use of a clock-pulse oscillator. However, such clock pulses usually comprise a series of pulses having equal time intervals, and, therefore, the measurement intended for the distance between the target lines 1 and 2 is actually the measurement of the length of an arc $\stackrel{\frown}{PP'}$ because the point A follows a circular scanning orbit, thus failing to measure the true straight line distance $l$ between the target lines. This will be described more specifically with respect to FIG. 1, where the radius R of the circular scanning orbit is represented by $\overline{OA}$, and the angles defined by the center lines X-X' and the points of intersection P, P' between the target-line position signal detecting sensor A and the target lines 1 and 2 are represented by $\theta$ and $\theta'$, respectively. The distance $l$ between the target lines 1 and 2 may be expressed as:

$$l = R(\sin \theta + \sin \theta') \qquad (1)$$

The sensor A is moved circularly at a uniform velocity along the scanning orbit 3 between the points P and P', and it follows that the measurement of the equal time intervals between the electrical position signals at the points P and P' effected by the use of the aforesaid clock pulses is actually the equal segmentation of the arc $\stackrel{\frown}{PP'}$ by such clock pulses, and after all, the length between the points P and P' obtained by such measurement may be said to be the length of the arc $\stackrel{\frown}{PP'}$.

Since the arc $$\stackrel{\frown}{PP'} = R(\theta + \theta') \qquad (2),$$

if the distance between the target lines 1 and 2 is measured by the use of the circular scanning method and conventional clock pulses, the result will suffer from the difference existing between equations (1) and (2) above. It will thus be obvious that such an essential sine error occurring to the circular scanning system must be corrected.

Figure 2:
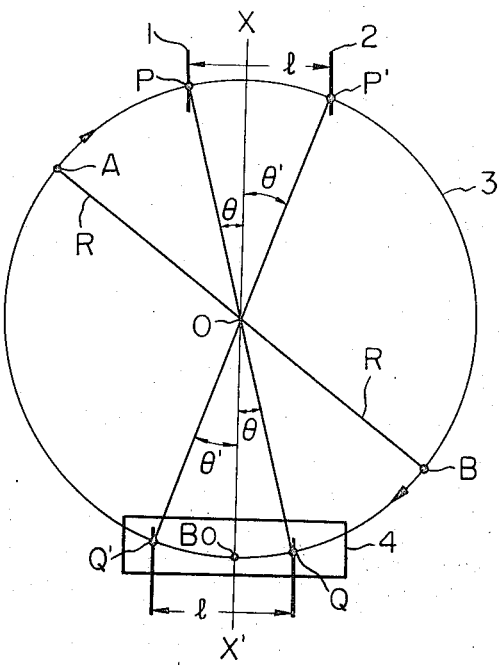
FIG. 2 is an illustration of the measuring method whereby the measurement error arising in FIG. 1 is corrected in accordance with the principles of the present invention.

FIG. 2 schematically illustrates a method of and an apparatus for correcting the above-described error in accordance with the principles of the present invention.

Thus, in FIG. 2, an optical pulse scale 4 is disposed at a predetermined location, as will now be described.

First, the location of the optical pulse scale 4 will be described with reference to FIG. 3 wherein the optical pulse scale 4 is formed with light and dark lines 5 and 5' which occur at equal intervals. The optical pulse scale 4 is so-positioned that these lines are parallel to the center line X-X' crossing the circular scanning orbit 3. Since the center lines X-X' is parallel to the target lines 1 and 2 as mentioned above, the lines 5, 5', formed on the optical pulse scale 4, are also parallel to the target lines 1 and 2. When such a positional relationship is established for the target lines 1, 2 and the optical pulse scale 4 with respect to the circular scanning orbit 3, it may be said that the optical pulse scale 4 is 180° out of phase with respect to the target lines 1, 2.

Turning back to FIG. 2, a point designated at B has a pinhole-like opening similar to that of the point A and functions to detect the light and dark lines 5 and 5' formed on the optical pulse scale 4, and the point B may tentatively be referred to as "optical pulse signal detecting sensor."

It is further assumed that the point B is at a position on the same circular scanning orbit as followed by the target-line position signal detecting sensor A but in a 180° out-of-phase relationship with the sensor A, that the optical pulse signal detecting sensor B comes to a point Q on the optical pulse scale 4 when the target-line position signal detecting sensor A intersects the target line 1 at the point P, and that the optical pulse signal detecting sensor B comes to a point Q' on the optical pulse scale 4 when the target-line position signal detecting sensor A intersects the target line 2 at the point P'.

In such a case, the target-line position signal detecting sensor A moves circularly to scan between the target lines 1 and 2 (or points P and P') while the optical pulse signal detecting sensor B is moving to scan between the points Q and Q' on the optical pulse scale 4, so that the sensor A produces target-line position signals and the sensor B produces pulse scale signals.

Also, assuming that the center line X–X' and the circular scanning orbit 3 intersect each other at a point $B_0$ on the optical pulse scale 4, it will be seen that an optical pulse signal, produced as the optical pulse signal detecting sensor B moves from the point Q to the point $B_0$ along the circular scanning orbit 3 to scan the optical pulse scale 4 located at the said predetermined position, corresponds to a pulse signal for measuring the sine variation occurring for the movement of the optical pulse signal detecting sensor B on the circular scanning orbit 3, namely, for measuring an amount $R \sin \theta$, where $R = \overline{OB}$. It will also be seen that a pulse scale signal produced as the optical pulse signal detecting sensor B moves from the point $B_0$ to the point Q' along the circular scanning orbit 3 to scan the optical pulse scale 4 corresponds to a pulse signal representing a length $R \sin \theta'$.

Accordingly, the pulse scale signals, produced as the optical pulse signal detecting sensor B scans from the point Q to the point Q', correspond to an amount $R (\sin \theta = \sin \theta')$, which connotes the distance $l$ between the target lines 1 and 2 as is apparent from equation (1). It will thus be noted that the aforesaid sine error peculiar to the circular scanning can be perfectly corrected by the present method.

It has been noted in respect of FIG. 2 that the optical pulse scale 4 and the target lines 1 and 2 are disposed so as to be 180° out of phase with respect to the circular scanning orbit 3; and correspondingly, the target-line position signal detecing sensor A and the optical pulse signal detecting sensor B are 180° out of phase wtih each other. However, depending on various cases, the phase relationship between the optical scale 4 and the target lines 1, 2 and between the target-line position signal detecting sensor A and the optical pulse detecting sensor B, need not always be 180°. Rather, it is essential that the phase relationship between the target lines 1, 2 and the optical pulse scale 4 be equal to that between the target-line position signal detecting sensor A and the optical pulse signal detecting sensor B, thereby enabling errorless measurement to be accomplished by circular scanning.

Also, in FIG. 2, it has been assumed that the circular scanning orbit of the target-line position signal detecting sensor A and that of the optical pulse signal detecting sensor B are identical with each other, whereas these two scanning orbits may be entirely different from each other. In the latter case, however, it should be noted that the distances over which the sensors A and B travel per unit of time are different in accordance with the different radii of the scanning orbits followed by the sensors A and B which, in turn, leads to the result that the length measure between the sensors A and B is not of the ratio of 1 : 1. Since such measure is equal to the ratio between the radii of the scanning orbits of the sensors A and B, as will be readily apparent, accurate measurement of the distance between the two target lines can be accomplished by selecting the pitch of the lines formed on the optical pulse scale 4 so as to compensate for the length measure.

Further, in FIG. 2, the target-line position signal detecting sensor A and the optical pulse signal detecting sensor B have been shown as having a common center of scanning revolution, whereas they may have distinct centers of revolution with their scanning revolution synchronized, thereby achieving the errorless measurement of the distance between the target lines.

Furthermore, while FIG. 2 shows the two sensors A and B as being circularly movable for scanning, both sensors may be immovably fixed and the target lines 1, 2 and the optical pulse scale 4 may be circularly movable, resulting in the same measuring effect as described above.

Again in FIG. 2, the optical pulse signal detecting sensor B has been shown as being circularly movable for scanning, but the same measuring effect may be achieved by fixing this sensor B at the point $B_0$ which is 180° out of phase with respect to the target lines 1, 2 disposing the optical pulse scale 4 in 180° out-of-phase relationship with the target-line position signal detecting sensor A and moving this scale 4 circularly for scanning.

Although the target lines have been assumed to take a bright, clear contrast with the background, they need not always be linear, but may be of any suitable optical pattern representing the positions of boundary portions between the light and the shade.

Accordingly, in the following description, the term "target line" is intended to be symbolic of an optical pattern for representing a position. Further, the target-line position signal detecting sensor A and the optical pulse signal detecting sensor B have both been assumed to have a pinhole-like opening but, in fact, the opening may take any other shape in accordance with the pattern of the target lines or the optical pulse scale. Furthermore, FIG. 2 has contemplated correction of the error resulting from the target lines 1, 2 and the optical pulse scale 4 being circularly scanned at the same velocity, whereas the sine error of the same nature may also occur in the measurement effected as by the ordinary scanning mechanism utilizing the angular variation; and therefore, the method as described hereinabove may equally be applicable for such ordinary scanning mechanism.

It will thus be seen that the type of scanning is not limited to circular scanning, but the ordinary scanning mechanism utilizing the angular variation may also be used.

The target lines 1, 2, optical pulse scale 4, target-line position signal detecting sensor A, optical pulse signal detecting sensor B, etc., which are arranged in such a relationship as to satisfy all the described conditions, constitute a scanning system adapted to effect circular scanning in the predetermined relationship as described above.

Figure 4:
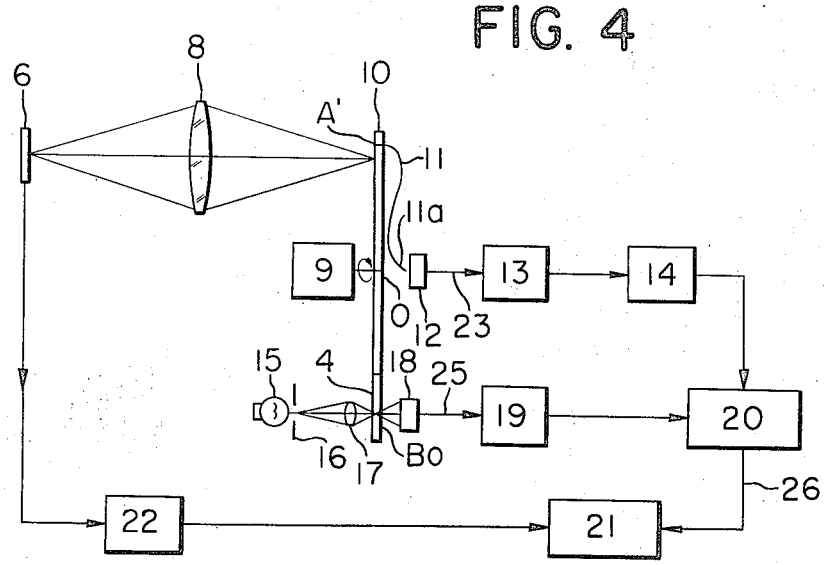
FIG. 4 is a combined schematic view and block diagram showing an embodiment of the present invention.

FIG. 4 shows a form of the present invention embodied in a digital displacement measuring apparatus utilizing the above-described method of errorlessly measuring the distance between two target lines through the circular scanning system.

A test sample 6 to be measured, as shown in FIG. 5, has parallel target lines 1 and 2 formed on the surface thereof at an interval $l_0$ (initial value), and it is assumed that the test sample 6 is such that, under a certain action, it is time-deformed in the direction of arrow 7 or 7' perpendicular to the target lines 1,2 until a certain point in time at which the target lines are displaced to the positions 1' and 2' to provide a distance $l$ therebetween.

The embodiment of FIG. 4 is intended to measure the distance between the target lines 1 and 2 at predetermined time intervals, thereby to obtain the amount of displacement of such inter-line distance.

In FIG. 4, numeral 8 designates an optical image-forming system for forming the image of the sample 6 at a predetermined location and at a predetermined magnification.

A motor 9 drives to rotate a rotary disc 10 about a point O at a predetermined number of revolutions. As shown in FIG. 6, the rotary disc 10 has attached thereto an optical fiber 11, as an optical guide, and the input end A' of the optical fiber 11 (which corresponds to the target-line position signal detecting sensor A in FIG. 2) can circularly move along the orbit having a radius $\overline{OA}'$ in accordance with the period of rotation of the rotary disc 10 to scan the optical image 6' of the sample 6 formed through the optical image-forming system 8, thereby periodically detecting the positions of the target lines 1 and 2 on the formed sample image 6'.

Figure 3:
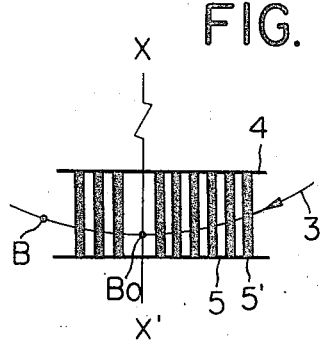
FIG. 3 is an enlarged view of an essential portion of FIG. 2.

The rotary disc 10 carries thereon the optical pulse scale 4 which has already been described with respect to FIGS. 2 and 3. The light and dark lines formed on the optical pulse scale 4 are disposed parallel to the straight line $\overline{OA}'$, passing through the input end A' of the optical fiber 11 to the center of rotation O of the rotary disc 10 (and in 180° out-of-phase relationship).

The point $B_0$, as indicated on the optical pulse scale 4, lies on the extension from the straight line $\overline{OA}'$ passing through the center O, and as will be later described, that is the point which is illuminated through the pinhole to read out optical pulse signals.

In FIG. 4, numeral 12 designates a photoelectric converter means by which the optical signals representing the positions of the target lines 1 and 2 provided by the output end 11a of the optical fiber 11 may be converted into electrical signals representing such positions.

When the target lines 1 and 2 are bright and clear with respect to the background, an electrical target-line position signal 23 produced by the photoelectric converter means 12 will rise at the positions of the target lines 1 and 2, as indicated in FIG. 7(a), thus providing a pulse signal having peaks 23a and 23b. Such electrical target-line position signal 23 is passed through amplifier means 13 to target-line position signal detector means 14, where the peak positions 23a and 23b of the electrical signal 23 are electrically detected, and the detection signals of such peak positions are defined as target-line position signals.

The target-line position signals thus-obtained are used to form a rectangular wave pulse signal 24 having rise and fall as shown in FIG. 7(b), and a gate circuit 20 uses the rectangular wave pulse signal 24 as gate signal for an electrical pulse scale signal 25, which will be described below.

On the other hand, a pinholed plate 16 (FIG. 4), formed with a pinhole of predetermined dimensions, is disposed for passing light from a light source 15 so that the pinhole image may be formed at the point $B_0$ through an optical image-forming system 17. As described previously, the point $B_0$ is that at which the optical pulse scale 4 (see FIG. 6) provided at a predetermined location on the rotary disc 10 is illuminated. Rotation of the rotary disc 10 causes the optical pulse scale 4 to be rotated therewith, so that the point $B_0$ moves relative to the optical pulse scale 4 to scan the light and dark lines formed thereon. The optical pulse scale signals representing the light and the dark, thus produced, are applied to photoelectric converter means 18, which converts the said optical pulse scale signals into an electrical pulse scale signal 25, as shown in FIG. 7(c). In this regard, the measure of the image 6' of the test sample 6 formed through the optical image-forming system 8 is the original measure of the test sample multiplied by the magnification of such optical system 8. Also, if in FIG. 6 the radius $\overline{OA}'$, of the circular orbit of the target-line position signal detecting sensor A' is different from the radius $\overline{OB}_0$ of the optical pulse scale read-out orbit, such difference will result in the measure $OA'/OB_0$ of the sample image 6' with respect to the optical pulse scale 4, and therefore, the measure of the test sample 6 with respect to the optical pulse scale 4 is, after all, a measure resulting from such two factors. Thus, the pitch of the lines formed on the optical pulse scale 4 actually in use has been subjected to such a correction.

The electrical pulse scale signal 25, which represents the true distance between the target lines as described previously, is passed through amplifier means 19 to the gate circuit 20, where it is gated by the aforesaid gate signal or rectangular wave pulse signal 24 (FIG. 7(b), thereby providing an inter-target distance signal 26, as shown in FIG. 7(d). The number of pulses contained in such inter-target distance signal 26 may be counted by counter means 21 to thereby obtain the value of the distance between the target lines.

Thus, when the sample object 6 is being time-deformed to vary the target lines 1 and 2, the distance between the target lines may be digitally measured at predetermined time intervals without any error being involved, and the speed of such measurement may be increased by shortening the period of scanning.

Reverting again to FIG. 4, the displacement measurement may be fully automated by providing stop signal detector means 22 to detect a signal representing either the stoppage of the deformation of the test sample 6 or a predetermined limit of such deformation, and using the stop signal from the stop signal detector means 22 to stop the counter means 21.

FIG. 8 shows another embodiment of the present invention. This embodiment includes a laser oscillator 27, an optical system 28 for forming the laser light into a predetermined beam of light, a mirror 29, and a beam splitter 30 through which light may be partly passed as light beam 31 and partly reflected as reflected beam 32.

A rotary reflection prism 34 is mounted at the center of rotation of a rotary disc 10' connected to an electric motor 9' and is rotatable in synchronism with the rotary disc 10'.

The reflected light beam 31 from the rotary reflection prism 34 scans a test sample 6'' as the prism 34 is rotated. The surface of the sample 6'' is formed with target lines as in the embodiment of FIG. 5, and these target lines are scanned by the light beam 31 to thereby produce optical target-line position signals.

Thus, the light beam 31 is directed to scan the target lines and used as the scanning beam for detecting the target-line positions.

Since the target lines may take various forms such as slits, points, boundaries between light and shade, etc., the pattern of the scanning beam 31 on the test sample 6'' should desirably be selected most suitably in accordance with the variable form of the target lines in order to provide target-line position signals of good S/N ratio. For this purpose, an optical system 33 may be provided to form the most suitable pattern of the scanning beam.

As the light beam 31 scans the target lines on the test sample 6'', there are provided optical target-line position signals. Therefore, if the reflected light from the surface of the test sample 6'' is condensed into the photoelectric converter means 12' through an optical condenser system 35, the photoelectric converter means 12' will produce electrical position signals. On the other hand, the reflected light beam 32 from the beam splitter 30 passes via a mirror 36 and through an optical pulse scale illuminating system 37 to illuminate the optical pulse scale 4' disposed at a predetermined location on the rotary disc 10', so that optical pulse scale signals are produced with the rotation of the optical pulse scale 4' and converted into electrical pulse scale signals by the photoelectric converter means 18'.

The electrical target-line position signals and electrical pulse scale signals produced in the described manner may be treated by the use of an electrical treating system similar to that shown in FIG. 4, whereby the distance between the target lines on the test sample 6'' may be obtained.

The target-line position signal detecting method using beam scanning as illustrated in FIG. 8 has the following features, as compared with the scanning method as illustrated in FIG. 4.

Firstly, the use of a laser as the source of the scanning beam leads to an effective utilization of the directivity, monochromatism and high brightness of the laser beam which, in turn, leads to a good S/N ration of the resultant signals.

Secondly, any desired scanning method may be adopted relatively easily for the test sample.

Thirdly, the distance between the target lines may be long.

Fourthly, the optical image-forming system in use need not be of high performance, and the adverse effect imparted to the measurement by movement or tilting of the test sample may be relatively reduced.

Thus, according to the present invention, the measurement error resulting from circular scanning can be perfectly corrected by a simple mechanical construction comprising a predetermined correlated arrangement of the test sample 6, optical pulse scale 4, target-line position signal detecting sensor A, optical pulse signal detecting sensor B, etc., without the need to use any complex apparatus like the conventional one wherein the intervals between clock pulses are synchronized with the circular scanning to provide automatic variations.

Moreover, when the test sample 6 to be measured has clear target lines 1 and 2, errorless measurement is ensured irrespective of the type of the sample 6 and the displacement of the target lines may also be measured reliably.

We believe that the construction and operation of our novel apparatus will now be understood, and that its advantages will be fully appreciated by those persons skilled in the art.

What is claimed is:

1. An apparatus for optically measuring the distance between two parallel reference lines on an object comprising:
    a focusing optical system for forming the image of said object,
    a rotary plate which has an optical pulse scale including at its peripheral portion parallel light transmitting portions and light intercepting portions alternately and equidistantly disposed in the circular direction, and which is rotatable within the focusing plane of said focusing system;
    a driving means for rotating said rotary plate;
    a photoconductive member fixed at its one end to the peripheral portion of said rotary plate so that the image of said object may be scanned optically by the rotation of said rotary plate and so that said photoconductive member may receive the optical signals of said reference lines;
    a first photoelectric conversion means for converting the optical signals transmitted through said photoconductive member to electrical signals;
    a pulse signal generating means including a point optical source which illuminates said optical pulse scale at least during the time interval from a time when one of said two reference lines is scanned by said photoconductive member to a time when the other reference line is scanned, and a second photoelectric conversion means for converting the optical pulse signals passing through said optical pulse scale to electrical pulse signals;
    a wave form shaping means for shaping said electrical pulse signals to provide rectangular wave signals;
    an AND circuit having two input terminals one of which receives said rectangular wave signals and the other receives said electrical pulse signals from said second photoelectric conversion means so that said electrical signals are gated by said rectangular wave signals to provide, as output signals, electrical pulse signals corresponding to said rectangular wave signals; and
    a counter means for counting the number of said electrical signals passing through said AND circuit.

2. An apparatus for optically measuring the distance between two parallel reference lines on an object comprising:
    a laser source;
    a rotary plate which has an optical pulse scale including at its peripheral portion parallel light transmitting portions and light intercepting portions disposed alternatively and equidistantly in the circular direction, and which is rotatable;
    a driving source for rotating said rotary plate;
    a reflecting member fixed at the rotary center of said rotary plate for reflecting laser light from said laser source so that said object may be scanned by the rotation of said rotary plate;
    a first photoelectric conversion means which receives the optical signals reflected by said object and converts said optical signals to electrical signals;

a pulse generating means including a point light source which illuminates said optical scale at least during the time interval from a time when one of said two reference lines is scanned by the rotation of said reflecting member to a time when the other of said two reference lines is scanned, and a second photoelectric conversion means for converting to electrical pulse signals light pulse signals generated from said point light source and passed through said optical pulse scale;

a wave form shaping means for shaping the electrical signals from said first photoelectric conversion means to provide rectangular wave signals;

an AND circuit having two input terminals one of which receives said rectangular wave signals and the other receives said electric pulse signals from said second photoelectric conversion means so that said electrical signals are gated by said rectangular wave signals to provide, as output signals, electric pulse signals corresponding to said rectangular wave signals; and a counter means for counting electric pulse signals passing through said AND circuit.

3. Apparatus according to claim 2, wherein said point light source is laser light divided by a beam splitter provided in the optical path of the laser light generated from said laser source.

* * * * *

UNITED STATES PATENT OFFICE
CERTIFICATE OF CORRECTION

Patent No. 3,791,735                    Dated February 12, 1974

Inventor(s) KIWAO NAKAZAWA ET AL.

It is certified that error appears in the above-identified patent and that said Letters Patent are hereby corrected as shown below:

Column 2, line 41, change "pulses" to -- pulse --; line 62, change "hereinto" to -- hereto --.
Column 4, line 2, change "line" to -- lines --; line 46, change "lines" to -- line --.
Column 5, line 33, change "(Sin θ = Sin θ')" to -- (Sin θ + Sin θ') --; line 42, change "detecing" to -- detecting --; line 43, change "wtih" to -- with --.
Column 6, line 28, change "take" to -- make --.
Column 10, line 12, change "object," to -- object; --; line 58, change "alternatively" to -- alternately --.
Column 11, line 2, after "optical", insert -- pulse --.

Signed and sealed this 24th day of September 1974.

(SEAL)
Attest:

McCOY M. GIBSON JR.
Attesting Officer

C. MARSHALL DANN
Commissioner of Patents